Nov. 6, 1945.  E. V. SUNDT ET AL  2,388,449
INDICATOR
Filed Aug. 5, 1943
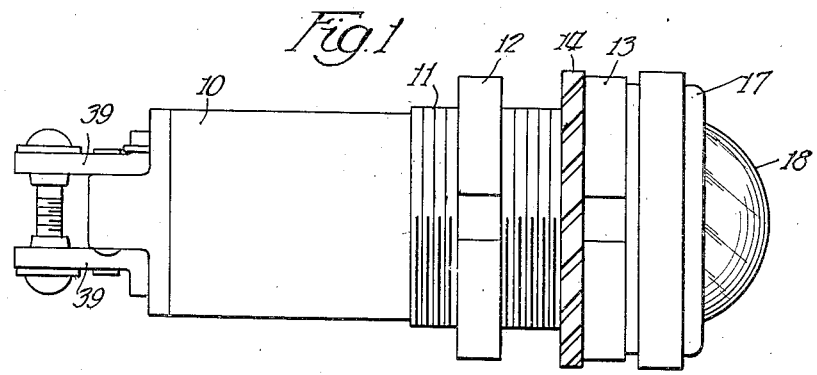
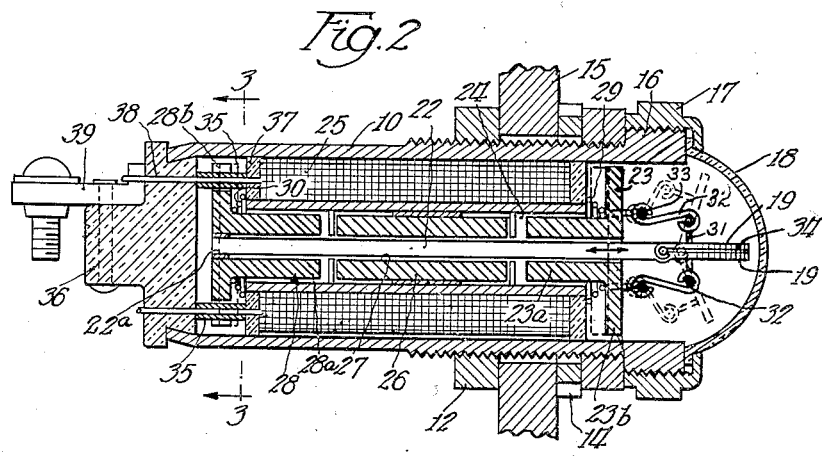
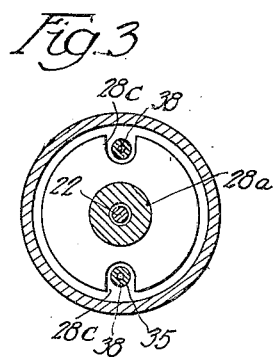
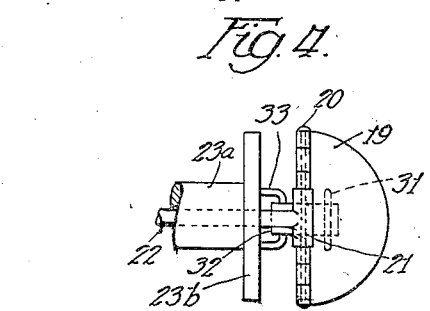
Inventors:
Edward V. Sundt.
Joseph Purcell.
By Sheridan Davis & Cargill. Attys.

Patented Nov. 6, 1945

2,388,449

UNITED STATES PATENT OFFICE 2,388,449

INDICATOR

Edward V. Sundt, Arcadia, and Joseph Purcell, El Monte, Calif., assignors to Littelfuse, Inc., Chicago, Ill., a corporation of Illinois Application August 5, 1943, Serial No. 497,428

11 Claims. (Cl. 177—329)

This invention relates to improvements in indicators.

One object of the invention is to provide a readily visible indicator adapted for use under various conditions of lighting, as for example in the cockpit of a military plane where the interior at times may be illuminated by bright sunlight and at other times, as during black-outs, may be completely devoid of artificial illumination or subjected only to the so-called "blacklight" from a source of ultra-violet radiations. The employment of incandescent "tell-tale" lamps as indicators frequently is not satisfactory, especially in military planes, since in bright day-light the lamps frequently are not readily visible and in "black-outs" they sometimes disturb the ocular adjustment of the pilots notwithstanding the lamps may emit light of low intensity.

An additional object of the invention is to provide an indicator for indicating the proper functioning of an instrument or like device which preferably provides a relatively large luminous area of low intensity-light reflection or radiation which is easily visible in daylight or in darkness.

Another object of the invention is to provide an indicator the movable parts of which are dynamically balanced for resisting movement from the non-indicating position by vibrations or by other extraneous forces to which the parts may be subjected during normal use.

In the drawing

Figure 1 is a side elevation of an indicator embodying the present improvements.

Figure 2 is a longitudinal sectional view thereof.

Figure 3 is a sectional view taken on line 3—3 of Fig. 2

Figure 4 is a broken detached side elevation of the pair of indicator vanes shown in Fig. 2.

The illustrated indicator, which is an improvement on the indicator shown in our co-pending application Ser. No. 485,476, filed May 3, 1943, is provided with a tubular iron casing 10 threaded on its exterior as indicated at 11 and carrying a pair of nuts 12, 13 and an interposed lock washer 14 for clamping the indicator in position in an opening in a panel, instrument board or dash 15. The nut 13 abuts a shoulder 16 formed by an enlarged end of the casing, as shown in Fig. 2. A bezel 17 is shown on the enlarged end, which may be threaded thereto for retaining a suitable dome-shaped lens or crystal 18 over the end of the indicator. Within the inclosure provided by the domeshaped lens 18 and the adjacent end of the casing 10 is a pair of pivotally connected vanes 19. The vanes are shown mounted on a pintle 20 which is mounted in a head 21 of a reciprocable rod 22 of non-magnetic material in the particular embodiment of the invention disclosed in the drawing. The rod passes through an axial aperture of an armature 23 which is provided with a cylindrical portion 23a which is movable within a core passage 24 of a solenoid winding 25 positioned within the casing 10. A magnetic core 26 is fixed approximately centrally within the core passage and is provided with an axial passage 27 through which the rod 22 extends.

The rear end of the rod 22 extends into an axial passage in a second armature 28, and is attached to the latter as by brazing or welding as at 22a. The armature 28 has a cylindrical portion 28a operable within the core passage of the winding 25.

The armature 23 is shown provided with a flange 23b, of greater diameter than the cylindrical body portion 23a. Likewise the armature 28 has a flange 28b of greater diameter than the body portion 28a. Disposed between the ends of the winding 25 and the adjacent flanges of the armatures 23 and 28 are springs 29 and 30 respectively each under suitable and like compression and providing in effect a floating mounting for the armatures, the rod 22, and the hinged wings 19.

The indicator vanes 19, as shown, are provided with eyes or loops 31 on their rear surfaces which by means of links 32 are connected to eyes 33 secured to the armature 23. The springs 29 and 30, being under compression, exert balanced forces outwardly on the armatures 23 and 28 whereby the vanes 19 tend to remain in the parallel relation shown in Fig. 2 and effect concealment of the inner faces of the vanes which are coated with suitable luminous materials 34. Only by moving both armatures inwardly toward the magnetic center of the coil can the vanes 19 be separated to or toward signalling relation. If a force be exerted in one axial direction or the other on the movably mounted structure as a whole, comprising the armatures 23, 28, rod 22 and vanes 19, such a vibration impulse imparted to the indicator from the mounting panel 15, there is no resulting separation of the vanes to give a false indication, or an interrupted visual indication of the state or condition of the instrument or device with which the indicator is employed. Upon the electrical energization of the coil 25 the armatures are moved toward the adjacent ends of the core 26 each against the respective springs and thus cooperate to effect hinged movement of the vanes 19 to the open positions indicated by dotted lines in Fig. 2 which open positions preferably approximate a separation of 140° arc. Extraneous vibration impulses acting axially of the operable mechanism while the vanes are in open position do not close the vanes nor cause them to flutter since the tendency of one of the armatures to move in either direction is opposed by the tendency of the other armature to move in the same direction by reason of the dynamically balanced and floating arrangement disclosed.

For the purpose of preventing the floating structure from rotating and effecting rotary displacement of the vanes from the desired positions, suitable guiding means for the structure may be provided. In the illustrated embodiment of the invention, guiding means are shown which are in the form of a pair of parallel, diametrically opposite insulating tubes 35 which extend from a base or end plug 36 in the rear of the casing 10 to the adjacent insulating end 37 of the winding 25. The flange 28a of the armature 28 is provided with apertures or recesses 28c as shown in Fig. 3, through which the tubes 35 pass and which constitute guides for preventing rotation of the floating balanced structures and rotative displacement of the vanes from selected positions. The guiding tubes 35 serve as insulators for lead out wires 38 of the coil, the wires being connected to suitable terminals 39 carried by the insulating base 36 and by means of which the indicator can be connected in a circuit for effecting indications of the operation of an instrument or other devices.

The vanes 19 preferably are semicircular in shape as shown in Fig. 4 and the luminous material 34 on the forward adjacent faces thereof may be of any suitable character. For example, the material may be in the form of paint applied thereto and such that it glows or is phosphorescent in the dark or will become phosphorescent when subjected to ultra-violet or "dark light." The pigment of the paint employed preferably is such that the indicator vanes, when in open or signalling position are readily visible in the daylight and the color of the light reflected or emanating from the coated surfaces during black outs is substantially uniform under different conditions of lighting, especially when the indicator is employed in the cock pit of a war plane, for example.

The improved structure described, by reason of the balanced construction of the movable parts remains stable in both indicating and non-indicating positions and while a particular embodiment of the invention has been shown and described for accomplishing that result, it will be apparent that various modifications of the structure may be made within the scope and spirit of the invention.

I claim:

1. An indicator comprising a pair of hingedly mounted indicator vanes movable to and from substantially parallel juxtaposed relation for concealing and exposing respectively adjacent indicating surfaces thereof comprising a pair of reciprocable operating members each operatively connected to said indicating members, and electromagnetic means for reciprocating said operating members simultaneously in opposite directions for effecting the concurrent movement of the indicator members to or from said parallel relation.

2. An indicator comprising a pair of pivotally mounted indicator members movable to and from substantially parallel juxtaposed positions, indicating coatings on the contiguous surfaces of the indicator members exposed for indicating purposes when the members are moved from said parallel relation and each concealed by the other member when in parallel relation, and a pair of electromagnetically operated dynamically balanced operating members provided with means connecting said operating members to both said indicating members and through said indicating members connecting each operating member to the other for constraining operation of said operating members in opposite directions only whereby the indicator members are movable simultaneously by said operating members in opposite directions from and to said parallel relation.

3. An indicator comprising a pair of pivotally mounted vanes movable to and from substantially parallel juxtaposed relation, indicating coating on adjacent surfaces of the vanes adapted to be concealed or exposed when the vanes are in parallel or non-parallel relation respectively, a magnetic winding, and a pair of spring biased oppositely movable armatures therefor each operatively connected to each of said vanes whereby movement of said armatures by the energization of said winding or by said springs effects concurrent opposite movement of said vanes from or to said parallel relation.

4. An indicator comprising a magnetic winding, a pair of armatures at the ends thereof operable simultaneously in opposite directions upon energization of the winding, spring means for returning the armatures simultaneously to original positions upon deenergization of the winding, and a pair of indicator members each hingedly attached to one of said armatures and each linked to the other armature whereby operation of the armatures by the winding effects movements of the indicator members in opposite directions from original positions and return movement of the armatures by said spring means effects restoration of the indicator members to said original positions.

5. An indicator comprising a magnetic winding having an axial passage therethrough, an armature at one end of the winding provided with an axial passage, a second armature at the other end of the winding provided with a rod extending through the axial passages of the winding and of said first armatures, spring means acting in opposite directions on the armatures in opposition to the magnetic pull of the winding for retaining the armatures in normal positions during periods of non-energization of the winding, and a pair of operable indicator members each operatively connected to said first armature and to an adjacent portion of the rod extending through the latter for operation from said normal positions upon actuation of the armatures by the winding and for restoration to said normal positions upon operation of the armatures by said spring means upon de-energization of the winding.

6. An indicator comprising a pair of swingable indicator members disposed normally in non-indicating positions and provided with indicating coatings on correlative surfaces arranged to be exposed upon swinging movement of the members from said non-indicating positions, a magnetic winding, a pair of armatures operable in opposite directions from normal positions by said winding upon energization of the latter, spring means acting on the armatures in directions for restoring the latter to said normal positions upon de-energization of the winding, and means operatively connecting each of said indicator members to said armatures whereby movement of the latter to and from said normal positions effects swinging movement of the indicator members to and from said non-indicating positions.

7. An indicator comprising a pair of indicator members swingable to and from indicating positions, and electro-magnetic means for swinging the members comprising a magnetic winding and dynamically balanced mechanism operable by the winding, said mechanism comprising a pair of armatures operatively connected to and supporting said members and operable by the winding in opposite directions upon energization thereof and spring means acting on the armatures for moving the same in opposite directions upon de-energization of the winding.

8. An indicator comprising a pair of indicator members swingable to and from normal positions, a reciprocable member to which both said indicator members are hingedly attached, a second reciprocable member attached to each said indicator members, means acting on said reciprocable members in directions tending to move said indicator members to and retain the same in said normal positions and means for moving said reciprocable members each in opposition to said other means for swinging said indicator members from said normal position.

9. An indicator comprising a pair of indicator vanes swingable to and from normal positions, a reciprocable member to which both said vanes are hingedly attached, a second reciprocable member attached to each vane, spring means acting on said reciprocable members in directions tending to move said vanes to and retain the same in said normal positions and electromagnetic means for moving said reciprocable member simultaneously in directions for swinging said vanes from said normal position.

10. An indicator comprising an electro-magnetic member including a magnetic coil and an armature mounted for reciprocatory movement relative thereto in response to the flow of current in said coil, a pair of normally parallel indicator members hinged together at one end and at said end to said armature for movement of said indicator members bodily with said armature, and means engaging free portions of said indicator means for effecting swinging movement of said members in opposite direction upon reciprocation of said armature and indicator members.

11. Apparatus comprising an electro-magnetic member including a magnetic coil and a pair of armatures mounted adjacent the coil for simultaneous reciprocating movements in opposite directions in response to the flow of current in said coil, a pair of normally parallel operable members each hingedly attached at one end to one of said armatures for movement therewith and for swinging movement relative thereto out of said parallel relation, and means linking a swingable portion of each of said operable members to said other armature whereby said reciprocating movements of said armatures cooperate to effect swinging movements of said operable members from said parallel relation.

EDWARD V. SUNDT.
JOSEPH PURCELL.